(12) United States Patent
Matousek et al.

(10) Patent No.: US 10,716,259 B2
(45) Date of Patent: Jul. 21, 2020

(54) THREE SECTION THRESHING CONCAVE CONFIGURATION AND ADJUSTMENT MECHANISM FOR AN AGRICULTURAL HARVESTING COMBINE

(71) Applicant: Tribine Industries LLC, Logansport, IN (US)

(72) Inventors: Robert A. Matousek, Valley Center, KS (US); Bryan S. Claerhout, Hesston, KS (US); Russell S. Secrest, Newton, KS (US)

(73) Assignee: Tribine Industries, LLC, Logansport, IN (US)

(*) Notice: Subject to any disclaimer, the term of this patent is extended or adjusted under 35 U.S.C. 154(b) by 207 days.

(21) Appl. No.: 15/681,461

(22) Filed: Aug. 21, 2017

(65) Prior Publication Data

US 2017/0339832 A1 Nov. 30, 2017

Related U.S. Application Data

(63) Continuation-in-part of application No. 14/967,691, filed on Dec. 14, 2015, now Pat. No. 9,820,442.

(51) Int. Cl.
| | |
|---|---|
| *A01F 12/26* | (2006.01) |
| *A01F 12/28* | (2006.01) |
| *A01F 12/18* | (2006.01) |
| *A01F 7/06* | (2006.01) |
| *A01F 12/22* | (2006.01) |
| *A01D 69/00* | (2006.01) |

(52) U.S. Cl.
CPC .............. *A01F 12/26* (2013.01); *A01F 7/062* (2013.01); *A01F 7/067* (2013.01); *A01F 12/181* (2013.01); *A01F 12/28* (2013.01); *A01D 69/00* (2013.01); *A01F 7/06* (2013.01); *A01F 12/22* (2013.01)

(58) Field of Classification Search
CPC ......... A01F 12/28; A01F 12/26; A01F 12/181
See application file for complete search history.

(56) References Cited

U.S. PATENT DOCUMENTS

| | | | | |
|---|---|---|---|---|
| 2,053,148 | A | * | 9/1936 | James ........................ A01F 7/06 209/398 |
| 3,589,111 | A | * | 6/1971 | Gullickson ............... A01F 7/06 460/67 |

(Continued)

*Primary Examiner* — Alicia Torres
(74) *Attorney, Agent, or Firm* — Mueller Law, LLC; Jerry K. Mueller, Jr.

(57) ABSTRACT

A rotor and cage assembly includes a skeleton of curved spaced-apart side members affixed to laterally extending upper and lower spaced-apart members therebetween and surrounding the rotor. One of the curved spaced-apart side members is terminated with curved fingers. Three concave inserts insert laterally into the skeleton spanning 270° around the rotor. One of the concave inserts carries straight fingers that interlace between the skeleton side member curved fingers. A control assembly of plates having arcuate slots placed at 3 of the pivots of the skeleton assembly, 3 control bars connected to the skeleton pivots, and an actuator is connected separately to each control bar at one end effect arcuate rotation of the control bars resulting in the synchronized rotation of the arcuate slotted plates so that the interlaced straight fingers move closer together or farther apart with the fixed skeleton assembly curved fingers for different types of grain.

7 Claims, 20 Drawing Sheets

(56) References Cited

U.S. PATENT DOCUMENTS

| | | | | |
|---|---|---|---|---|
| 4,330,000 A | * | 5/1982 | Peiler | A01F 12/28 460/109 |
| 4,440,179 A | * | 4/1984 | Bassett | A01F 12/16 209/660 |
| 6,358,142 B1 | * | 3/2002 | Imel | A01F 12/26 460/107 |
| 9,149,001 B2 | * | 10/2015 | Holtmann | A01F 12/28 |
| 2011/0151951 A1 | * | 6/2011 | Regier | A01F 12/181 460/109 |

* cited by examiner

THREE SECTION THRESHING CONCAVE CONFIGURATION AND ADJUSTMENT MECHANISM FOR AN AGRICULTURAL HARVESTING COMBINE

CROSS-REFERENCE TO RELATED APPLICATIONS

This application is a continuation-in-part of application Ser. No. 14/967,691 filed Dec. 14, 2015, and claims benefit of provisional application 62/517,279.

STATEMENT REGARDING FEDERALLY SPONSORED RESEARCH

Not applicable.

BACKGROUND

The present disclosure relates to harvesting articulated (jointed) combines and more particularly to improved concaves in the forward tractor or crop processing power unit (PPU).

Most agricultural combines use a rotary threshing and/or separating system including at least one rotor drivingly rotated about a rotational axis within a rotor housing, the housing having a lower region including a perforated concave spaced radially outwardly of the rotor. The rotor often may have a frusto-conical inlet end having a helical flight or flights therearound for conveying a flow of crop material into the space between the rotor and the housing. The main body of the rotor typically will have an array or layout of threshing elements, most commonly including rasp bars and separating elements, and/or elongated tines, all of which protrude radially outwardly therefrom into the space. The rasp bars and separator bars are configured differently, so as to perform different functions and may not all be present on a given rotor design. The functions of the rasp bars include to cooperate with one or more vanes and guides typically disposed around the upper portion of the inner circumference of the rotor housing, for conveying a mat of the crop material along a generally helical path through the space, while cooperating with the vane or vanes and/or guides, and other aspects of the concave, e.g., bars, perforations and the like of the concave, to break up larger components of the crop material into its constituents, namely larger constituents or elements of crop residue commonly referred to as straw, which includes stalks, stems, cobs and the like, and smaller constituents which comprise the grain and smaller elements of material other than grain (MOG), in the well known manner.

Rasp bars usually are relatively narrow and generally concentrated nearer the inlet end of the rotor and include a plurality of serrations defining grooves in the threshing element. These grooves are oriented at small acute angles to, or generally aligned with, the direction of rotation of the rotor for raking or combing through the mat of crop material and uncoupling the smaller constituents from the crop material thus allowing the grain to fall through the openings in the concave. Straight separator bars, in contrast, are often longer and generally located nearer to the discharge end of the rotor and include one or more bars with at least one sharp edge extending perpendicular to the direction of rotation to plow the larger components of the crop mat and carry them away from the smaller grain and MOG. The function of typical straight bars is to disrupt the consistent flow that shorter rasp bars establish and, thereby, cause grain to be shaken out of the straw due to that turbulence.

Application Ser. No. 14/967,691, now U.S. Pat. No. 9,820,442, disclosed a rotor and cage assembly that includes a skeleton of curved spaced-apart side members affixed to laterally extending horizontal (upper and lower) spaced-apart members therebetween and surrounding the rotor. One of the curved spaced-apart side members is terminated with curved fingers. Three concave inserts insert laterally into the skeleton spanning 270° around the rotor. One of the concave inserts carries straight fingers that interlace between the skeleton side member curved fingers. A control assembly of plates having arcuate slots placed at 3 of the pivots of the skeleton assembly, control bars connected to the skeleton pivots, and an actuator connect to the control bars at one end effect arcuate rotation of the control bars resulting in the synchronized rotation of the arcuate slotted plates so that the interlaced straight fingers move closer together or farther apart with the fixed skeleton assembly curved fingers for different types of grain. The interlacing and overlapping concave inserts permit the three sections of 270° degree wrap to expand and contract their combined circumference as the concaves move nearer and farther from the rotor swung diameter. This movement is necessary in order to adjust to various crops and conditions, specifically and intentionally to prevent wide gap spaces between concave inserts especially when the assembly is in its open position. A reasonably identical grate assembly, which may or may not allow adjustment, follows and is adjacent to the concaves skeleton and also surrounds the rotor. Of course, the number of concave inserts could be greater or lesser in number and extend to less or more than 270°. For present purposes, the two different sets of fingers "interlace" both by being laterally offset (side-to-side), but also by being vertically offset (up-and-down). The key for interlaced fingers is that they move closer together and further apart for different types of grains.

In the current disclosure, the control system that interconnects each of the 3 sections has been replaced by individual control for each section.

BRIEF SUMMARY

Disclosed is a rotor and cage assembly for a harvesting combine, which includes a rotor having a longitudinal axis of rotation; a skeleton having curved spaced-apart side members affixed to laterally extending horizontal spaced-apart members therebetween with pivots where they connect. The skeleton surrounds the rotor. One of the curved spaced-apart horizontal members is terminated with curved fingers. 3 concave inserts insert laterally into the skeleton spanning 270° around the rotor. One of the concave inserts carries straight fingers that interlace with the skeleton horizontal member curved fingers. A control assembly includes plates having arcuate slots placed at 3 of the pivots of the skeleton assembly; 3 control bars connected to the skeleton pivots; and 3 actuators each connected to a different control bar at one end for arcuate rotation of the control bars independently so that the interlaced straight fingers move closer together or farther apart with the fixed skeleton assembly curved fingers for different types of grain. A grate assembly follows and is adjacent to the concaves skeleton and surrounds the rotor. The grate assembly may have 3 grate inserts inserted laterally into a grate skeleton assembly spanning 270° around the rotor.

A controller may control the actuators to adjust each of the 3 sections simultaneously to be the same or to be different. The actuators may be linear actuators powered by hydraulics, electrical, or pneumatic.

These are other features will be described in detail below.

BRIEF DESCRIPTION OF THE DRAWINGS

For a fuller understanding of the nature and advantages of the present method and process, reference should be had to the following detailed description taken in connection with the accompanying drawings, in which:

FIG. 18A is a blowup of the fingers of the concaves assembly of FIG. 18 with the fingers in a closed position consonant with the concaves being in a closed position;

FIG. 19A is a blowup of the fingers of the concaves assembly of FIG. 19 with the fingers in an open position consonant with the concaves being in an open position;

The drawings will be described in greater detail below.

DETAILED DESCRIPTION

It is known in the agricultural harvesting industry that one can control the relative amount of material that is discharged through a porous concave surface by changing the amount of clearance that a given area of the surface has to the rotor. Wider clearance tends to discharge less material than tight clearance. In commonly owned application Ser. No. 14/967,691, the clearance of the surface area (called opening or closing the concave) of the 3 sections is changed by a control mechanism that connected the 3 sections and is controlled in the cab by the combine operator. Disclosed herein is the individual remote control of each of the 3 sections by 3 linear actuators, one of which is associated with each of the 3 concave sections.

Referring initially to FIGS. 1, 2, 3, and 4, an articulated harvester, 10, consists of a powered PPU, 12, a rear grain cart, 14, and an articulation joint, 16, that connects PPU 12 with rear grain cart 14. The details of articulation joint 16 are disclosed in commonly owned application Ser. No. 14/946,827 filed Nov. 20, 2015. PPU 12 carries a grainhead, 18, operator's cab, 20, grain cleaning and handling assembly, and engines. PPU 12 is devoid of any grain storage, such being exclusive in rear grain cart 14. While both PPU 12 and rear grain cart 14 are shown being carried by wheel assemblies, one or both could be tracked. A screened air inlet, 15, is located atop PPU 12 where the air likely is the cleanest around harvesting combine 10.

An off-loading auger assembly, 22, is in the folded home position and being carried by rear grain cart 14. Grain cart 14 also bears a foldable roof, 24, shown in an open position, but which can fold inwardly to cover grain stored in rear grain cart 14. Foldable roof 24 may be made of metal, plastic, or other suitable material, but may be made of durable plastic for weight reduction and easy folding/unfolding. A grain storage bin, 28, carried by grain cart 14 may be made of plastic also in keeping with desirable weight reduction; although, it could be made of metal also at the expense of weight. All plastic parts may be filled with particulate or fiber reinforcement in conventional fashion and could be laminate in construction. Further details on rear grain cart 14 can be found commonly owned application Ser. No. 14/946,842 filed Nov. 20, 2015, now U.S. Pat. No. 9,901,030.

Figure 1:
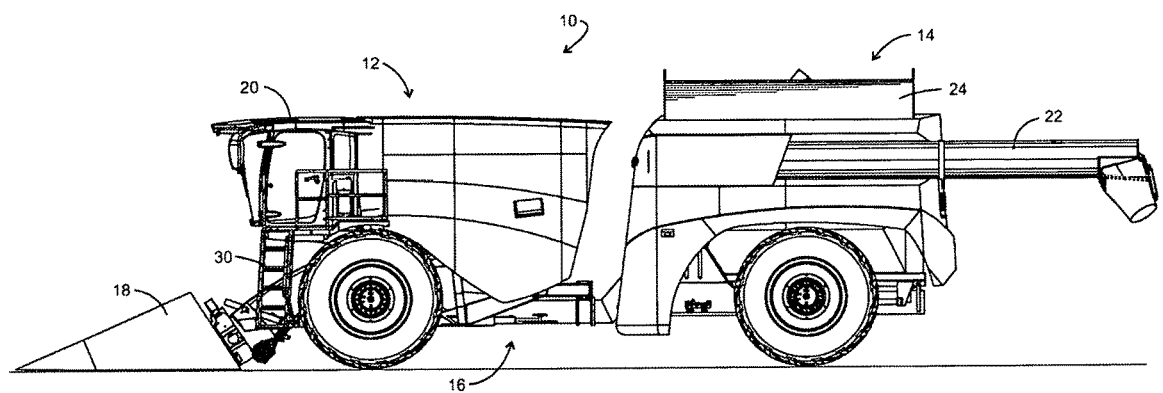
FIG. 1 is a side elevation view of an articulated combine having the disclosed grain cart.
Figure 2:
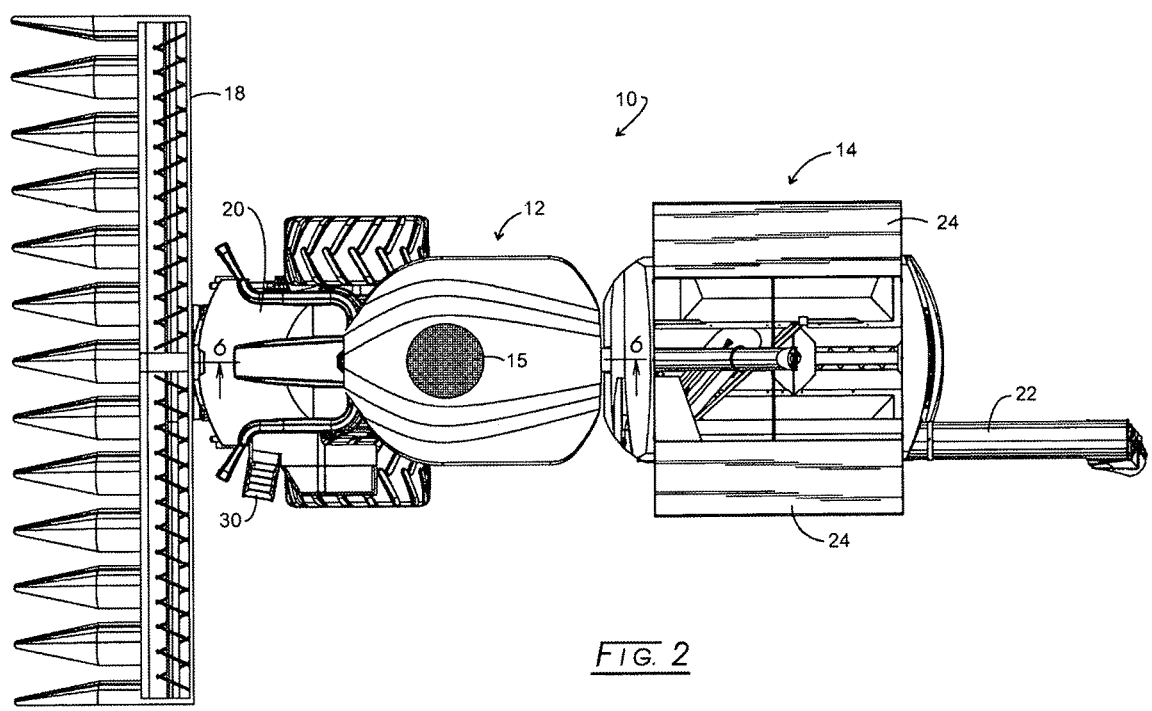
FIG. 2 is an overhead view of the articulated combine of FIG. 1.
Figure 3:
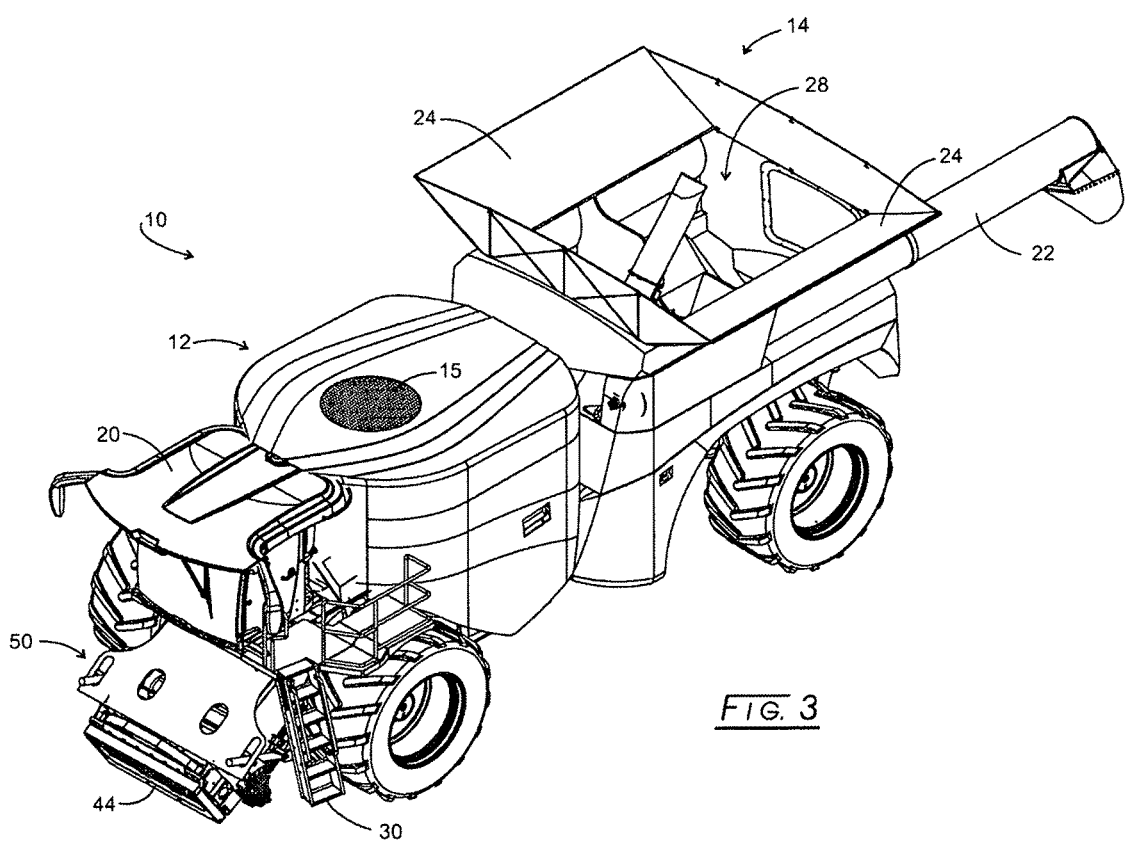
FIG. 3 is an isometric view of the articulated combine of FIG. 1.
Figure 4:
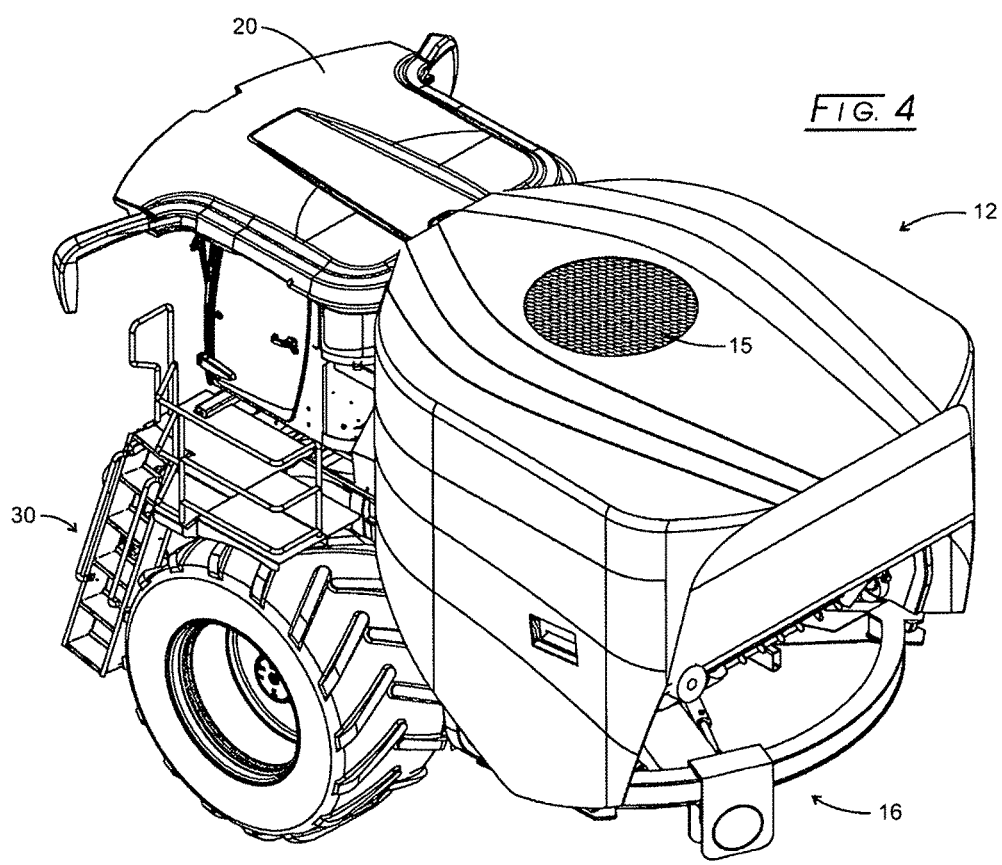
FIG. 4 is an isometric view of the PPU from its rear.
Figure 5:
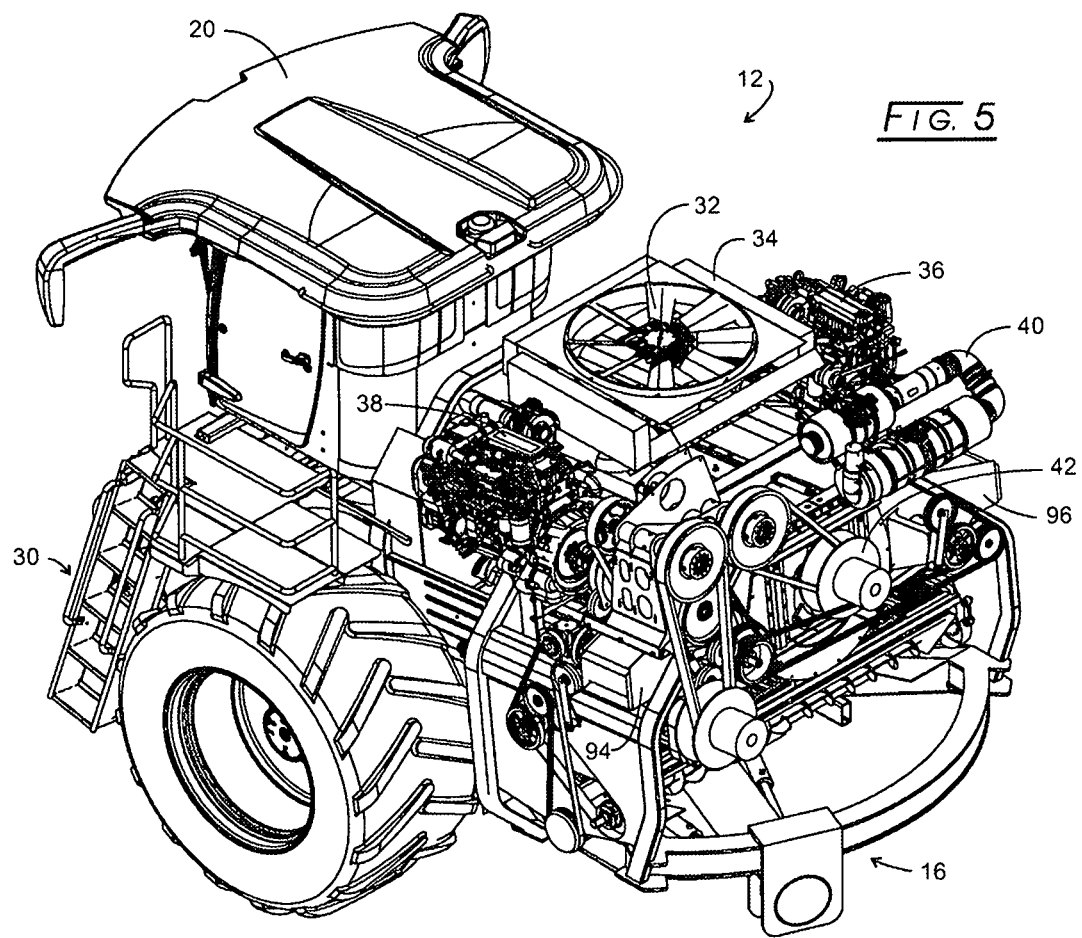
FIG. 5 is the isometric view of FIG. 4 with the outer shell or skin removed from the PPU.

Referring now to FIG. 4, the operator is granted access to cab 20 by a stair assembly, 30, that extends upwardly from just above the ground and will be more fully disclosed in commonly owned application Ser. No. 15/654,786, filed July 2017, now abandoned. The skin or shell has been removed in FIG. 5 to reveal the components housed within PPU 12. A fan assembly, 32, is located centrally for air to enter through screened air inlet 15. This location was chosen, as it arguably will be the cleanest flow of air around PPU 12. Radiators, as typified by a main cooling system air box, 34, surround fan assembly 32 and are coolingly connected with a pair of engines, 36 and 38, located on either side of main cooling fan assembly 32. Engine 36 powers the hydraulics for articulated combine 10, while engine 38 powers all other components of articulated combine 10. Exhaust after treatment assembly, 40, cleans air for emission control. When firing up the engines, which typically will be diesel engines, engine 38 is started first so that coolant flowing through engine 38 will warm up engine 36 and the hydraulic fluid for articulated combine 10. The twin engines aspect will be described in detail in commonly owned application Ser. No. 15/643,685, filed July 7, now U.S. Pat. No. 10,257,977, with access to the engines and other internal components described in detail in commonly owned application Ser. No. 15/662,332, filed Jul. 28, 2017, now U.S. Pat. No. 10,155,550. Other components visible in FIG. 5 will be described in detail below.

Figure 6:
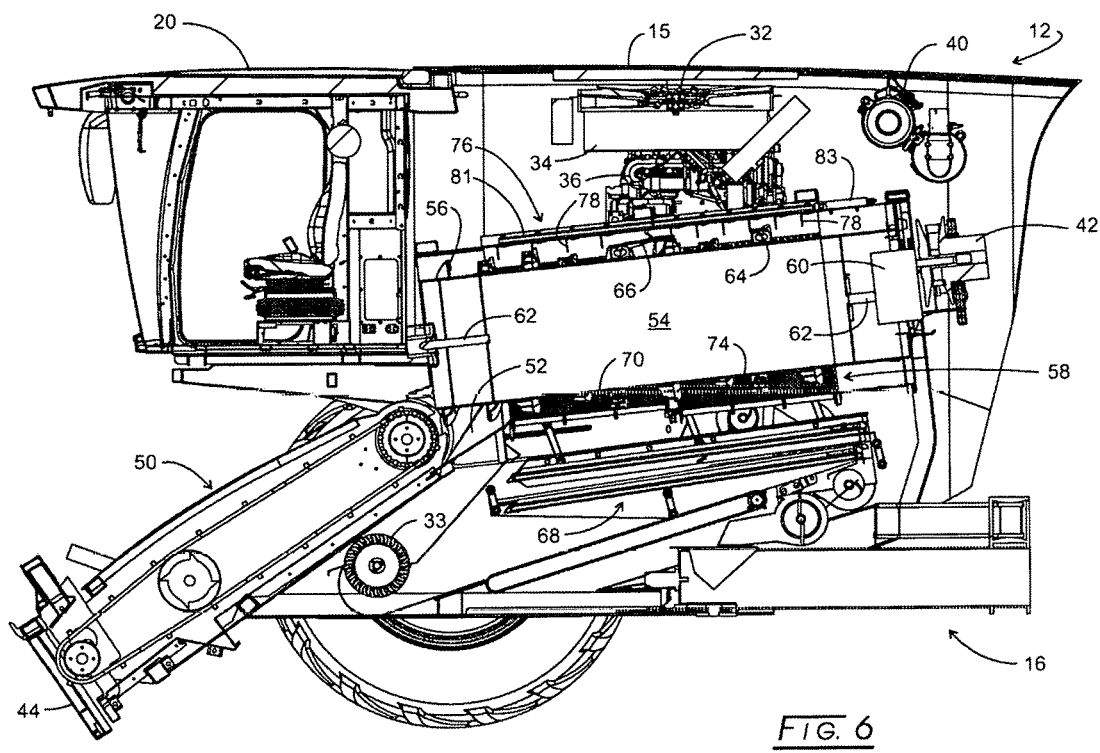
FIG. 6 is a sectional view taken along line 6-6 of FIG. 1.

Looking next at FIG. 6, grainhead 18 typically will be between about 30 and 50 feet wide and severs the crop in various fashions from its stalk or its attachment to earth. Grainhead 18 is carried by a feeder face adapter, 44, to a feeder mechanism assembly, 50, as described in detail in commonly-owned application Ser. No. 15/621,218, filed Jun. 13, 2017, which conveys the severed crop consisting of both stalk and grain. By convention in the industry, all material that is not grain is referred to as "Material Other than Grain" or, simply, "MOG".

Figure 10:
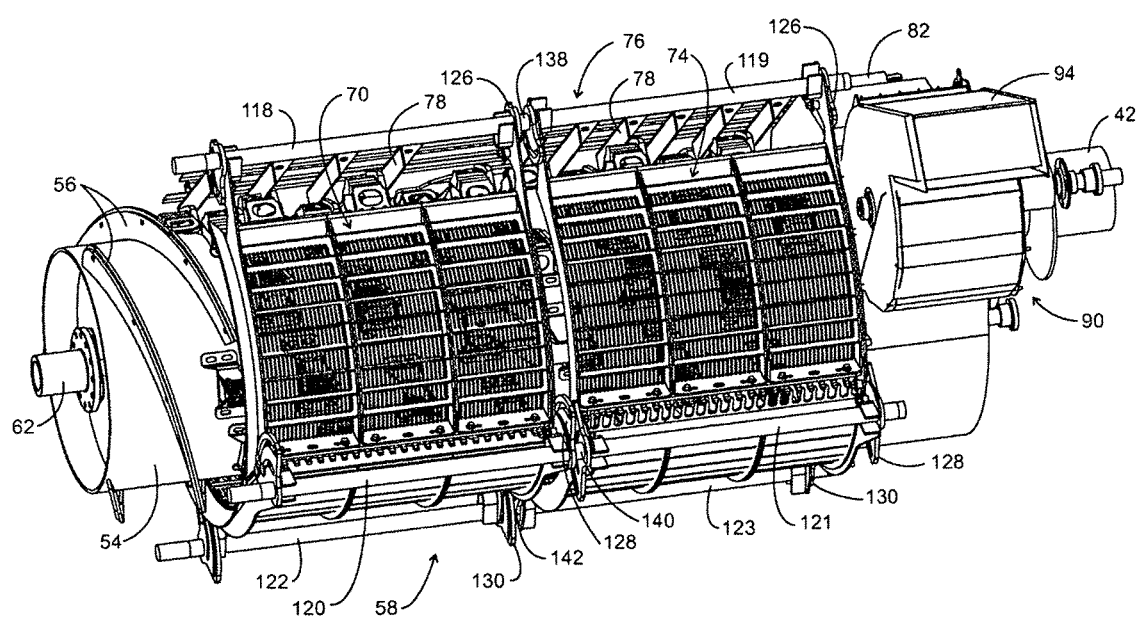
FIG. 10 is a side isometric view of the concaves of FIG. 9.
Figure 12:
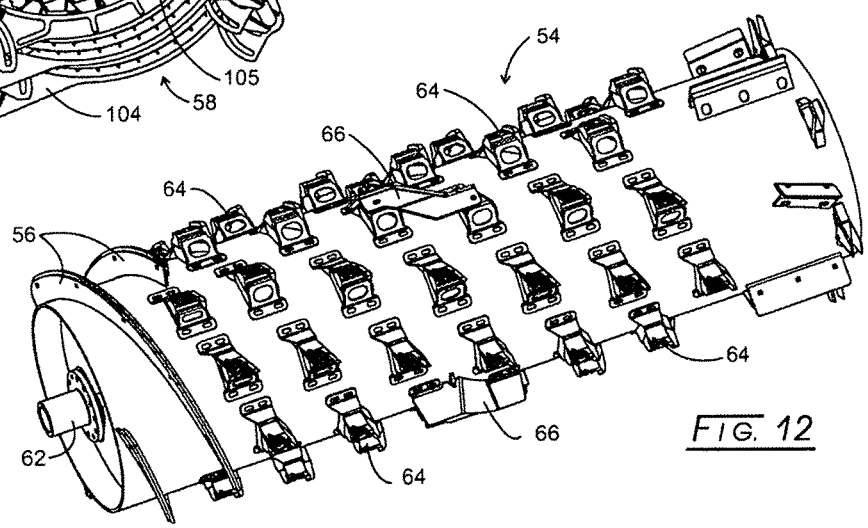
FIG. 12 is a side isometric view of the rotor assembly of the concaves.

Progressing rearwardly, the crop material reaches the end of feeder assembly 50 at velocity and is projected rearwardly and upwardly onto the walls of a transition cone, 52, which is a robust structure that describes shape and direction of material flow and generally funnels the flow of crop material toward both sides and the bottom of a rotor inlet cone, 52, of a spinning rotor, 54 (see FIGS. 10 and 12). Rotor inlet spiral flighting, 56, is identified as the front portion of rotor 54 that is predominately 2, 3, 4, or more large auger flights attached to the skin of rotor 54 and serve to both propel the crop material rearward into a rotor cage, 58, and begin the rotation of the crop material (as viewed from the rear of the module) around the periphery of rotor cage 58. The rotation of rotor 54 occurs by virtue of a pulley assembly, 42, a gearbox, 60, and shaft, 62. Rotor cage 58 is the empty space located within the rotor tube and is formed by concaves, grates, and a top cover with vanes that define the rotor tube or cylinder within which the rotor rotates and provides all stationary surfaces that the grain is threshed against and separated therethrough.

The process within rotor cage 58 delivers the crop material off the end of flights 56 and onto rasp bar assemblies for grain threshing and separation (see FIG. 12). These rasp bar assemblies may be rough cast iron configurations that impact, move, and pinch the crop material in order to dislodge the grain from the MOG parts of the plant, such that the grain can be removed from the flow. A typical rasp bar, 64, as are all rasp bars, is attached to rotor 54 by means of its bolting to barnacles, as typified by a barnacle, 66, which in turn is welded to rotor 54 in carefully identified locations to form the desired spiral patterns on the rotor as a whole. The rasp bars will be located in a spiral configuration around rotor 54 such that the crop material will be rolled, twisted, and rubbed against itself, the net affect of which will be to have significantly enhanced and substantially "gentler" threshing action, thereby nearly eliminating grain damage common to units that "smack the crop with steel" to achieve threshing. Each raps bar assembly, then is composed of a rasp bar and a barnacle.

Figure 13:
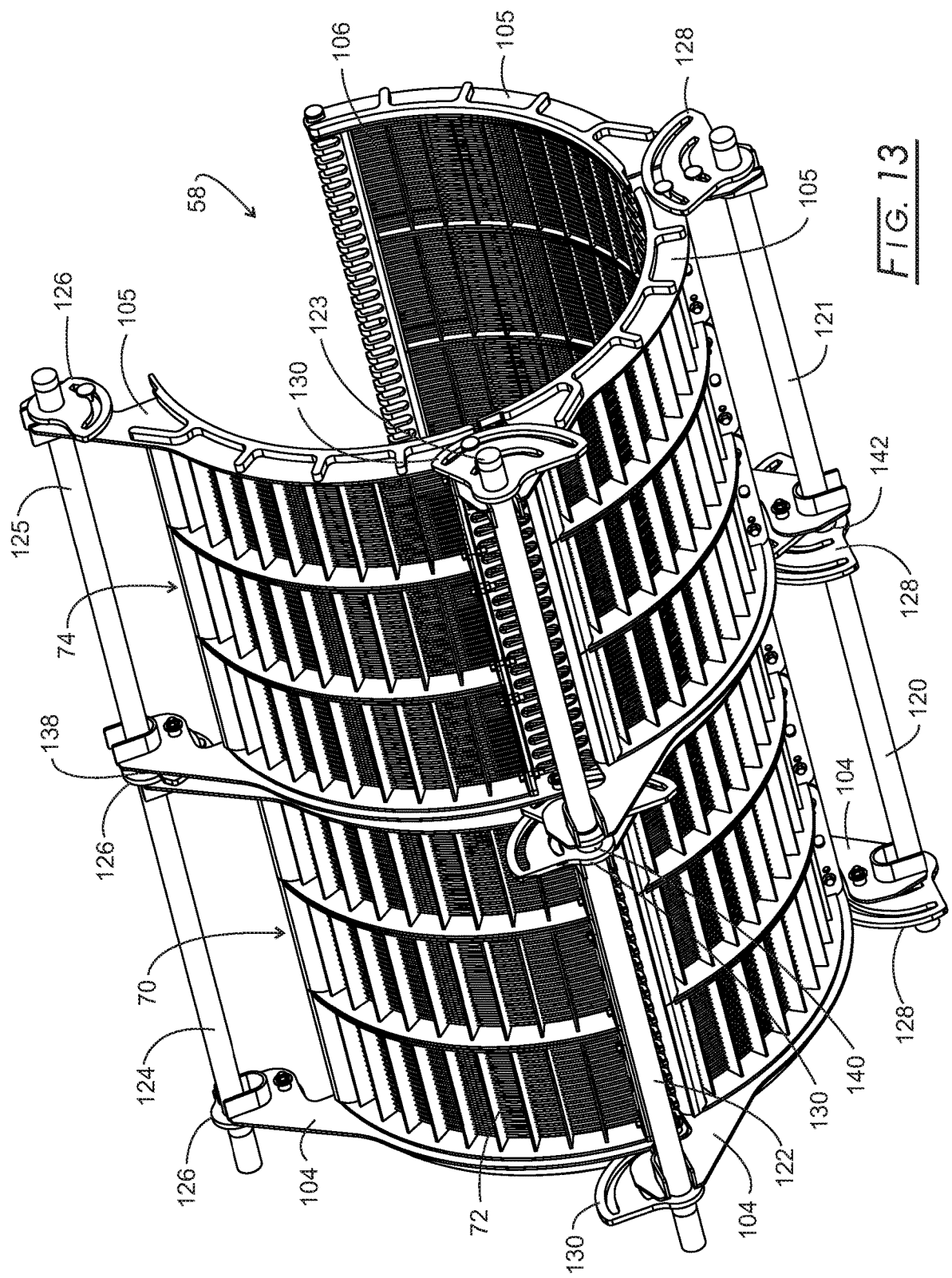
FIG. 13 is a bottom isometric view of the concave grates and concaves frame assembly.
Figure 18:
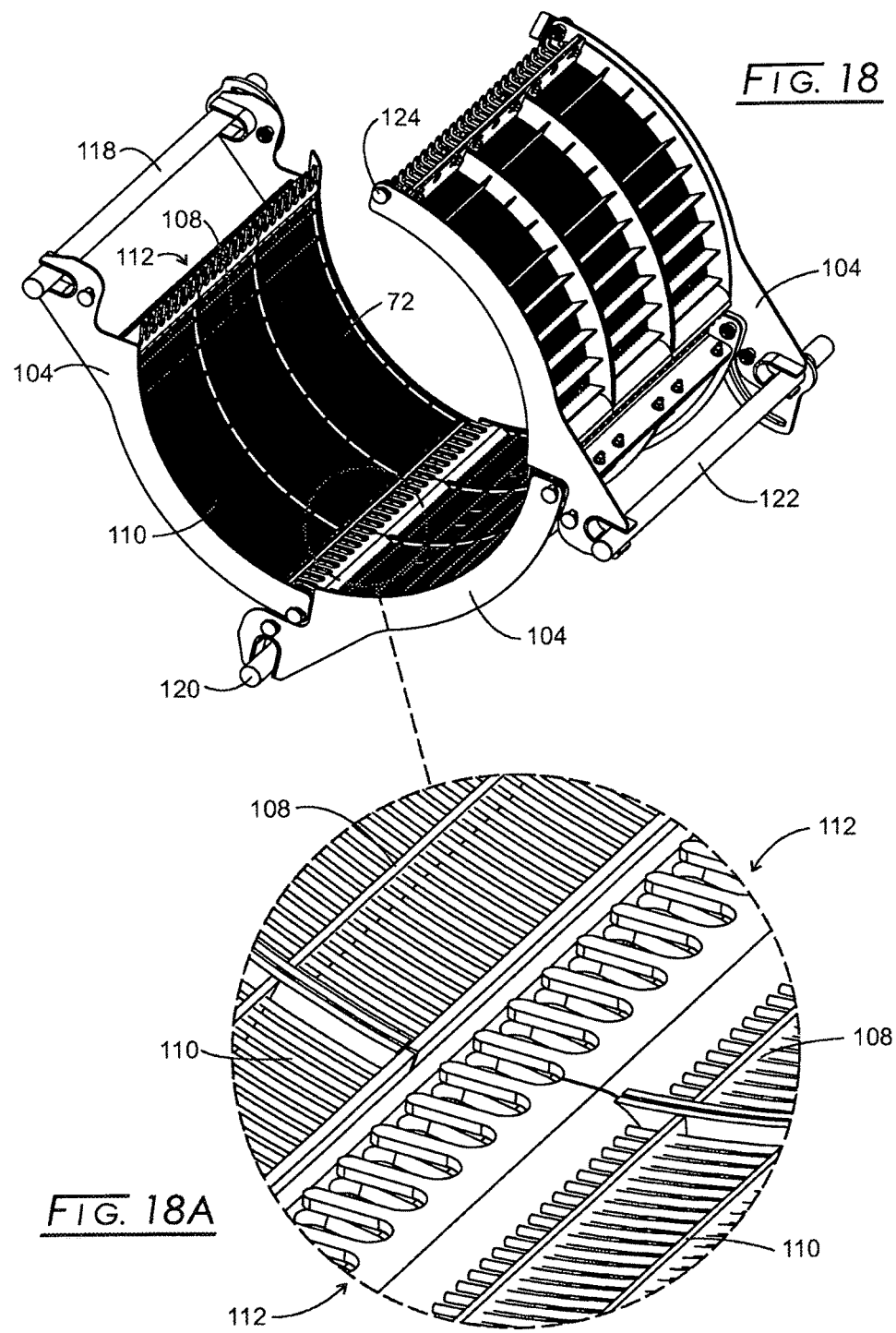
FIG. 18 is an isometric view of the concaves assembly in a closed position.

Entry into rotor cage 58 begins the threshing process, as the rasp bars rub the crop material across concaves, 70 (see also FIGS. 10 and 13), which are porous structures typically made of steel that surround the lower 270° of the periphery of rotor cage 58 and are divided into three sections, each of which covers 90°. Concaves 70 can have numerous actual structural constitutions, but in general provide a rough surface to cause significant rubbing and turbulence between the rasp bars and the top surface of concaves 70. Additionally, concaves 70 also are quite porous (have holes) to allow released grain to exit through the holes to be introduced to a cleaning area, 68 (or cleaning section, cleaning system sieves, or cleaning system assembly, or cleaning system). The concave inserts (often simply called "concaves"), as typified by a concave insert, 72 (see FIGS. 13 and 18), change from one type of surface to a different type of surface as crop type and condition dictate. Ideally and typically, this front section (~½) of the length of rotor cage 58 can remove nearly 75% of the entrained grain from the MOG material, and coincidentally pass on perhaps more than 80% of the MOG to a separation section or cleaning section 68 that follows and is described in greater detail in commonly owned application Ser. No. 15/642,799, filed Jul. 6, 2017. Typical to all harvesting combines, concaves 70 are suspended from above such that they can be moved in and out relative to the rasp bars swung diameter to cause a change in the relative clearance of the rasp bars top surface to the concaves inner surface. This allows for varying aggressiveness in the threshing process contrasted to crop type and condition and will be described in detail later herein.

Figure 19:
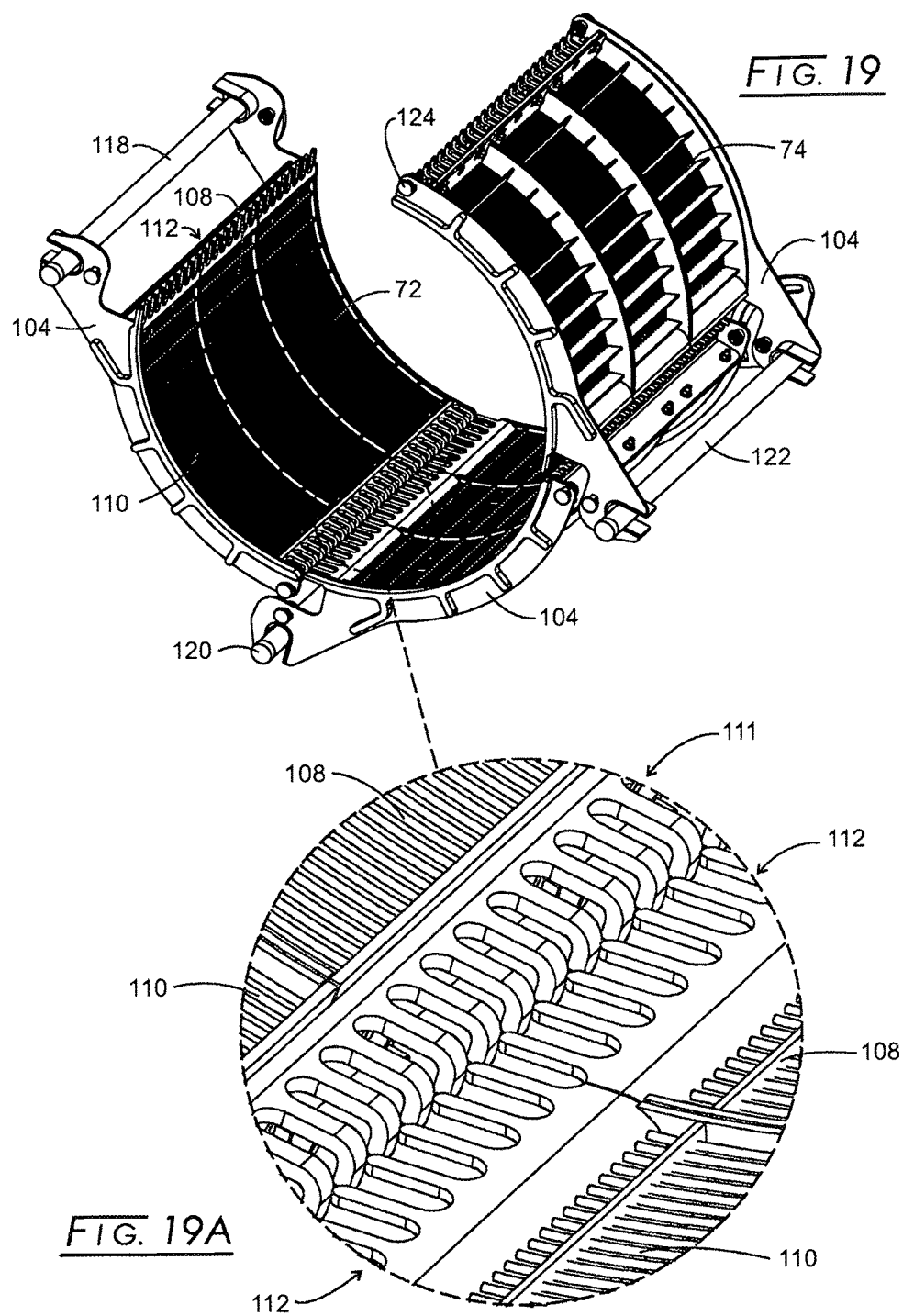
FIG. 19 is an isometric view of the concaves assembly in an open position.

The separation section of rotor cage 58 is located immediately behind (upstream) the threshing section and is for most part identical to the threshing section. By tradition, the same inserts that are located in the threshing area are now called grates, 74 (see FIG. 19), when in this rearward portion of the process. Typically, grates 74 are fixed in place and do not adjust in and out as do concaves 70; however, because the mechanisms are identical to the concave supports, grates 74 could be adjusted and that capability will be disclosed herein. The intended function of grates 74 is to separate the remaining grain from the MOG; however, since the MOG to grain ratio now significantly favors the MOG, the proportion of MOG exiting grates 74 is quite a bit higher that from concaves 70. All of this material falls downward toward cleaning system sieves 68.

Figure 7:
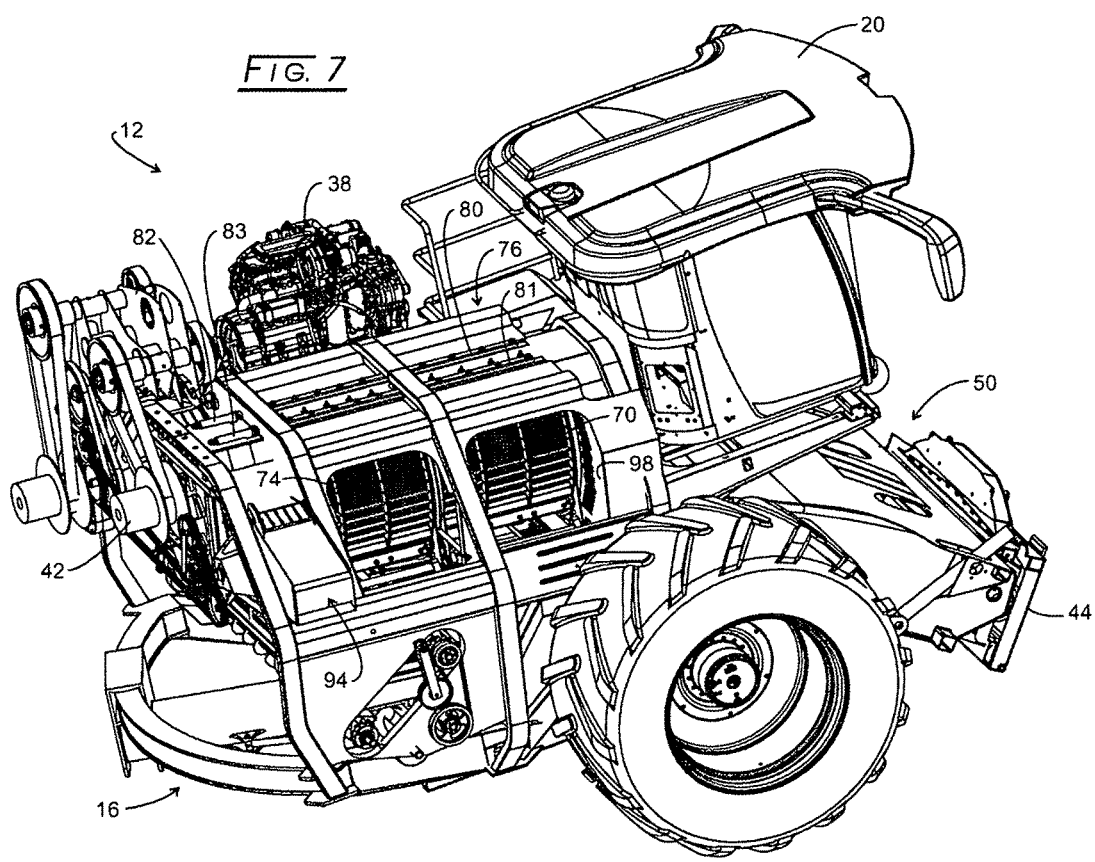
FIG. 7 is an isometric view like that of FIG. 5 of the opposite side of the PPU.

An important and new feature in rotor cage 58 is a top cover vane assembly, 76 (see FIG. 10), as typified by a vane, 78, located on the underside of the flat roof section of rotor cage 58. The vanes are basically steel angle plates that bolt thru the top cover on the one horizontal leg, and protrude downwardly into the crop flow with their 90° vertical leg. These vanes serve to regulate the speed of flow of material thru rotor cage 58, thereby affecting the relative aggressiveness of threshing and separation. When set at an angle more perpendicular to axial flow, the vanes retard the flow rate; when set at an angel less perpendicular ("laid back" or "sped up" in the language), the vanes allow faster, less power intensive flow. All other rotary combines have a curved top cover that requires the cage vanes to be curved also. This curvature sincerely limits the range of adjustment due entirely to the fact that as (for instance) a vane that would conform to a line that is perpendicular to axial on the cage cylinder, would be curved too much to fit a position that was 30° off of perpendicular. With the flat surface disclosed herein will have on the top cover. The vanes of top cover vane assembly (see FIG. 7) are attached to tubular control bars, 80 and 81, which is moved by cylinders, 82 and 83, to control their angle. Control can be exercised remotely in cab 20 by the operator to give the operator a tool that will be effective in controlling throughput versus threshing versus separation to optimize productivity of harvester 10. Top cover vane assembly 76 is described in great detail in commonly owned application Ser. No. 15/623,619, filed Jun. 15, 2017, now U.S. Pat. No. 10,238,038.

Finally the MOG (which by convention now changes its name to straw or residue) now located at the rear of the separation area (grates 74) is ready to be discharged from rotor cage 58 to be spread across the ground. In PPU 12, this will be done quite unconventionally by discharge openings in rotor cage 58 to discharge assemblies that contain straw chopper assemblies, 90 and 92 (see FIG. 9), where rapidly rotating drums with numerous swinging blades will reduce the length of the residue pieces and propel them horizontally and transversely outwardly at high velocity. Assisting in the chopping process are stationary knives, ("counter knives", "fixed knives"), not seen in the drawings, which act as shearing surfaces to hold the long residue for the swinging (sharp) knives to better cut the residue.

Figure 8:
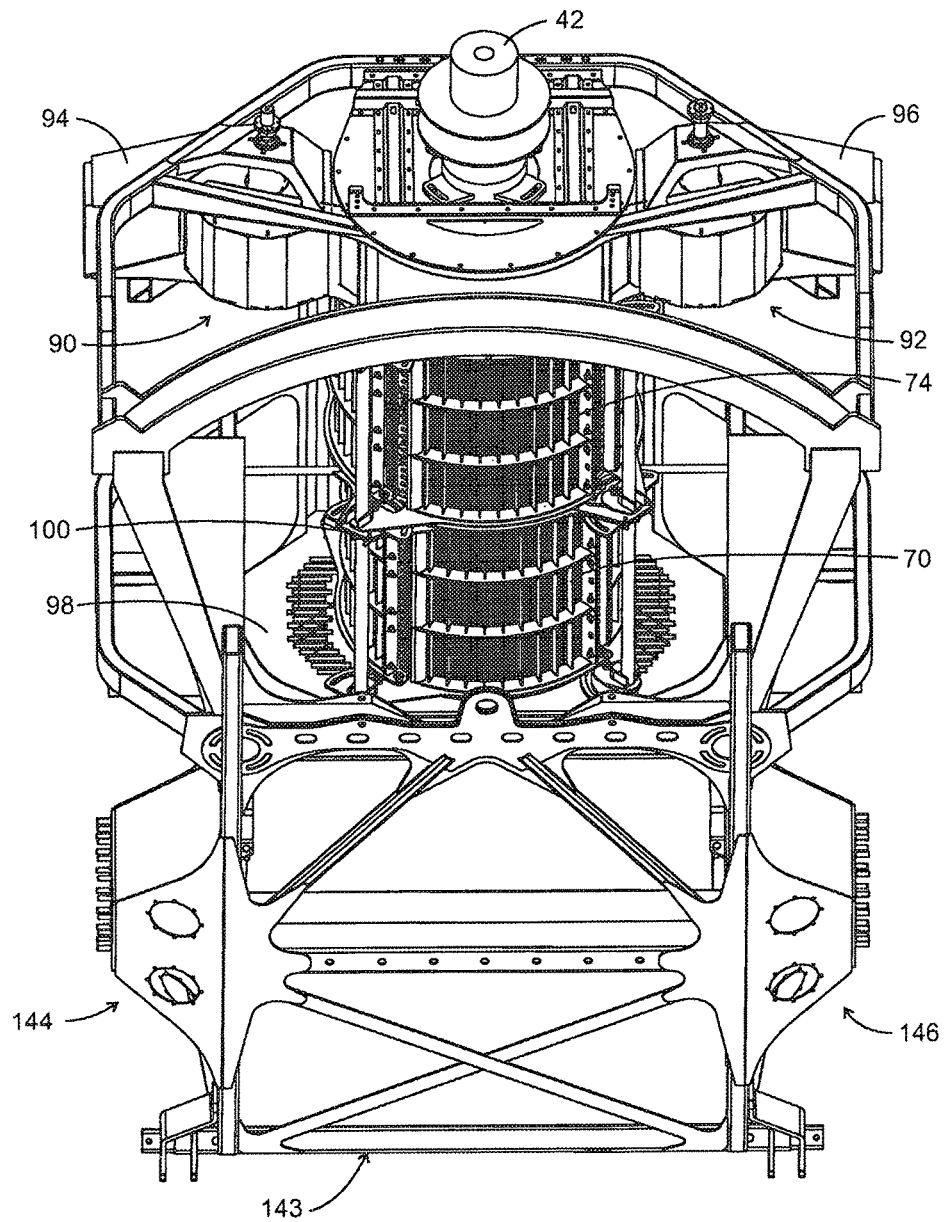
FIG. 8 is a bottom view of the PPU.
Figure 9:
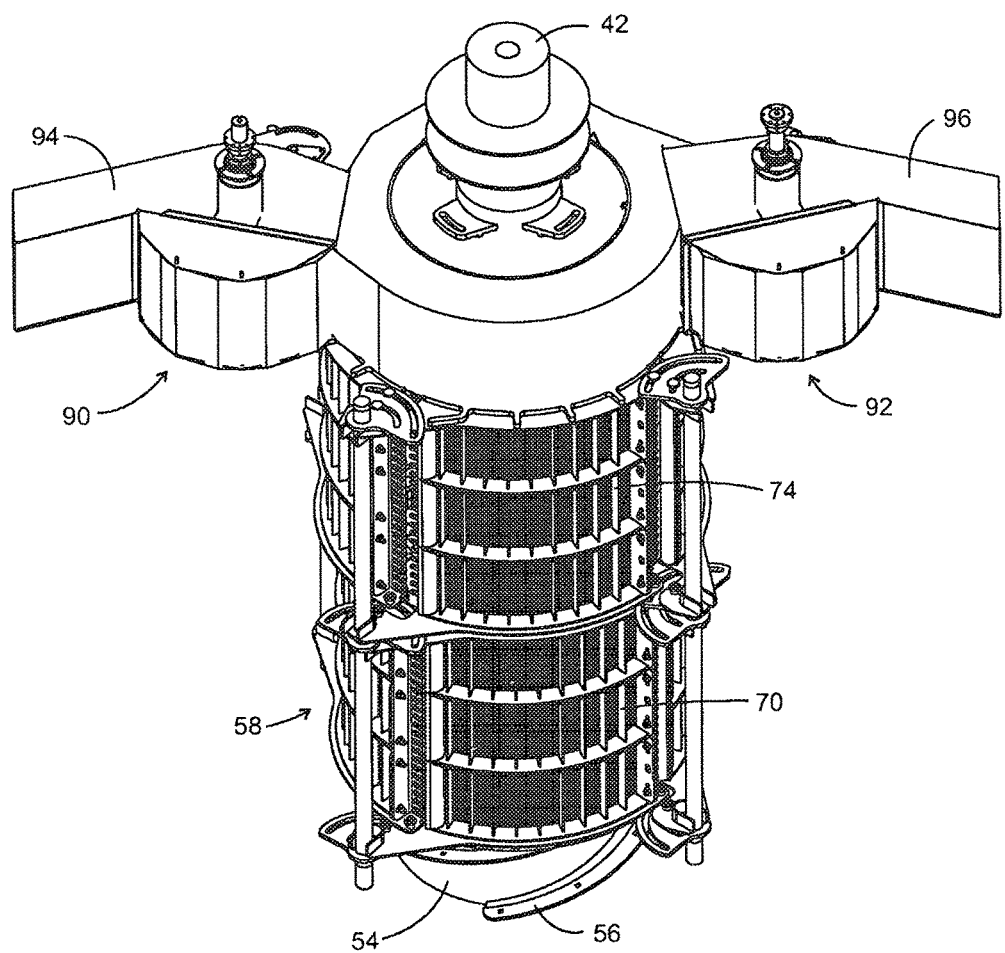
FIG. 9 is a bottom view of the concaves section of the PPU and includes the twin straw choppers.

Shortly after chopping and propulsion, the residue pieces will encounter straw hood assemblies, 94 and 96 (see FIG. 9), that is used as a deflector to influence the direction of the pieces such that some continue far out away from the vehicle, while variably others fall at distances from the vehicle, causing and ideally uniform distribution of the pieces over the ground surface. PPU 12 will have two sets of these chopper assemblies and knives 90 and 92, one on each side as seen in FIGS. 8 and 9 and described in detail in commonly assigned application Ser. No. 15/652,806, filed Jul. 18, 2017, now U.S. Pat. No. 10,244,685.

Returning to the MOG and grain that is being expelled through concaves 70 and grates 74, these materials exit the inserts at reasonably high velocity and on a trajectory imposed by both their angular velocity from spinning in rotor cage 58 and from the centrifugal force imparted by rotation of rotor 54, the net of which is largely an outward (if not radial) departure from rotor cage 58 down into the void below rotor cage 58 and above cleaning system assembly 68 (see FIG. 6) known as the "chaffer" (its purpose in the process is to help remove the bigger, lighter chaff from the grain by allowing the grain to fall through while rejecting the chaff to be blown out the rear of the machine). However, in accordance with the present disclosure, an additional cleaning component that takes advantage of that exit velocity of the material mix leaving the separation system is provided. Front Bulkhead 98 of the rotor/cage support structure has louvered slots (see FIG. 8) in it that will allow high velocity air being forced downwardly into a plenum to which the bulkhead is one wall, the driving force of the air being cleaning charge fan assembly (see FIG. 6) located above the rotor cage, in front of main cooling system air box 34 (see FIG. 6). The charge fan assembly will be collecting exhaust air from a cooler assembly 34, imparting new velocity to it and sending it down through the plenum formed by front cage bulkhead 98, rotor inlet cone 52, a separator sidesheet, and a cover sheet to complete the plenum. The purpose being to deliver air from above PPU 12 down through the plenum and into the inlet of cleaning fan 33, located in front of the axle, as explained in detail in U.S. Ser. No. 15/642,799.

As a matter of secondary assurance of high capacity, and because the disclosed PPU 12 configuration allows it, a bonus sieves assembly, as disclosed in commonly assigned application Ser. No. 15/649,684, filed Jul. 14, 2017, now U.S. Pat. No. 10,045,488, is provided. Unknown to the rest of the industry, these bonus sieves are allowed by the rear axle for harvesting combine 10 being on rear module 12, not beside the sieves. So the frame of PPU 12 will bulge outwardly wider once past the front tires, and fill that space on each side of the main sieves with narrower, shorter sieve members, bonus sieves, that in total will add about 20% more sieve area. Moreover, remembering the condition of having a much higher MOG ratio being expelled from the rear of the separation area, this bonus sieves area will add additional cleaning area back where the cleaning is made more difficult by higher MOG concentrations, whether that be in the airstream or on the sieve surfaces.

Under the front majority of the major sieves' length, a clean grain conveyor, a belt conveyor (running rearward on the top) that catches the grain as it falls, and conveys it rearward to a clean grain cross auger. A secondary, but equally important, function of the flat top of the conveyor is to serve as a converging plenum versus the lower sieve, such that the air being moved rearward by the cleaning fan is progressively forced to be directed upward through the sieves, thus powering the pneumatic cleaning function of the cleaning system. If stray MOG were to fall through both sieves, this is yet another chance for that MOG piece to be blown rearward, and perhaps out of the system. Again, this is disclosed in detail in U.S. Ser. No. 15/642,799, cited above.

The fate of the separated clean grain exiting the various cleaning systems in PPU 12 and its transfer to grain cart 12 is disclosed in commonly owned application Ser. No. 14/946,827, cited above.

Finally, PPU 12 will contain a tailings return system, as disclosed in detail in commonly owned application Ser. No. 15/649,684, cited above, that will be located below and aft of the aft of cleaning assembly 68. Material that is small enough and dense enough to fall through the extreme rear section of the chaffer, referred to as a chaffer extension, and material that because of size or low density could not fall through the lower sieve will be delivered to a tailing auger trough. In the trough is a tailings cross auger, an auger with opposing flighting, that this time augers the material outward from the middle. As the material reaches the sidesheets of the major structure, it enters a tailings elevator, one on each side of the structure. Running on a sprocket on the (each) end of the cross auger will be a roller chain with rearward leaning paddles that are also canted to move the material inward against the inner wall as it is conveyed upward. The leaning and canting of the paddle reduces the conveying efficiency while also increasing the tumbling and rubbing of the unthreshed grain against the walls and outer ring of the elevator chute. This "rethreshed" material will then be introduced back into cleaning system 68 above the bonus sieves by auger flights on a tailings top drive shaft to make another attempt at proper cleaning and saving, or to be rejected again, and, in either case, it will in one way or another be ejected from the system.

Figure 11:
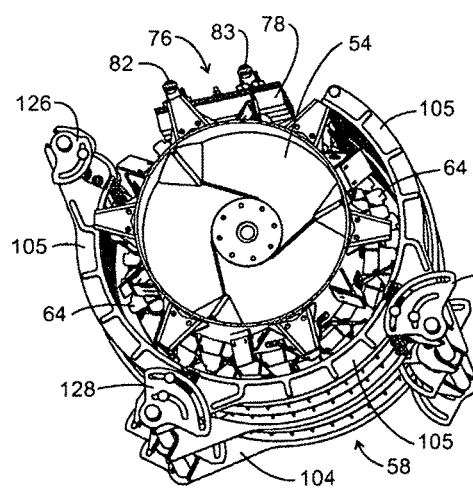
FIG. 11 is a front isometric view of the concaves of FIG. 8.

At this point in the disclosure, we look at FIGS. 8, 10, and 11 whereat the support for concaves 70 and grates 74 are shown. In particular, a front bulkhead, 98, a middle bulkhead, 100, and a rear bulkhead, 102, provide support for the rotor/cage structure.

Figure 20:
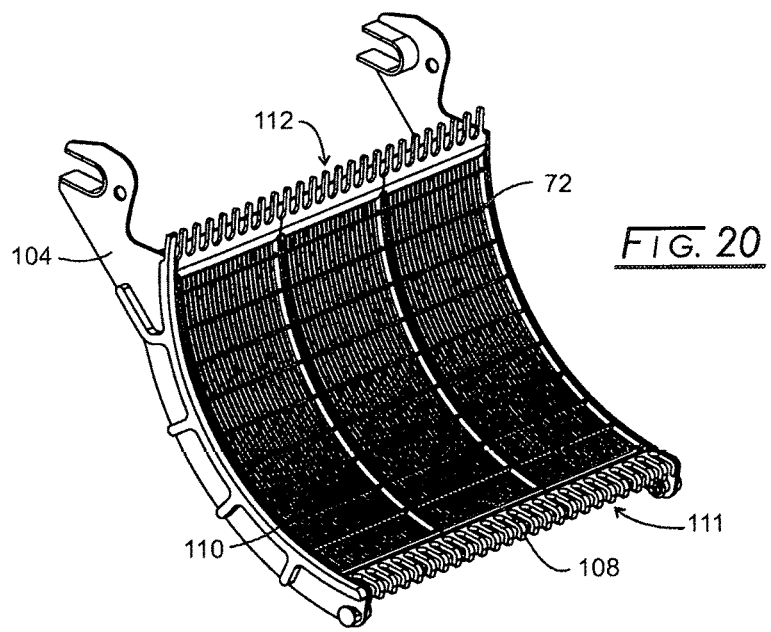
FIG. 20 is an isometric view of one of the 3 concaves.
Figures 21A, 21B, 21C:
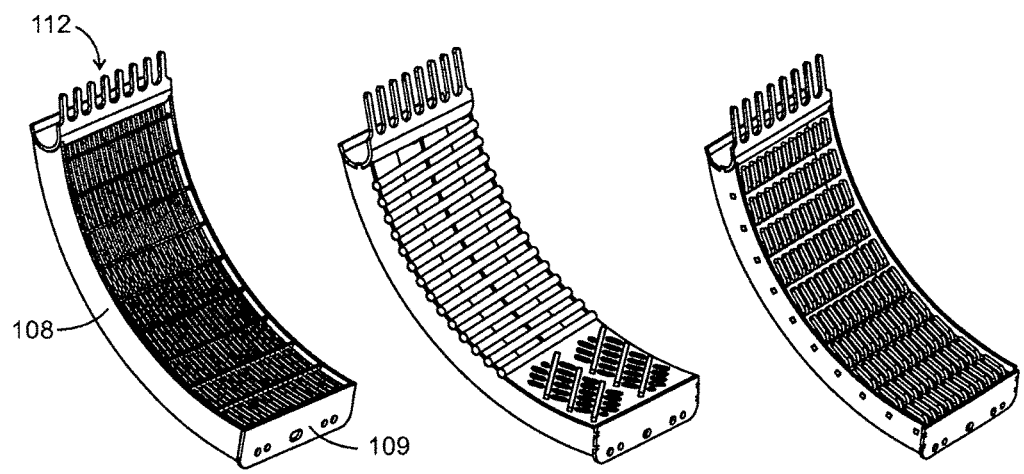
FIGS. 21A, 21B, and 21C are isometric views of three different concave insert designs for use with different kinds of grains.
Figure 22:
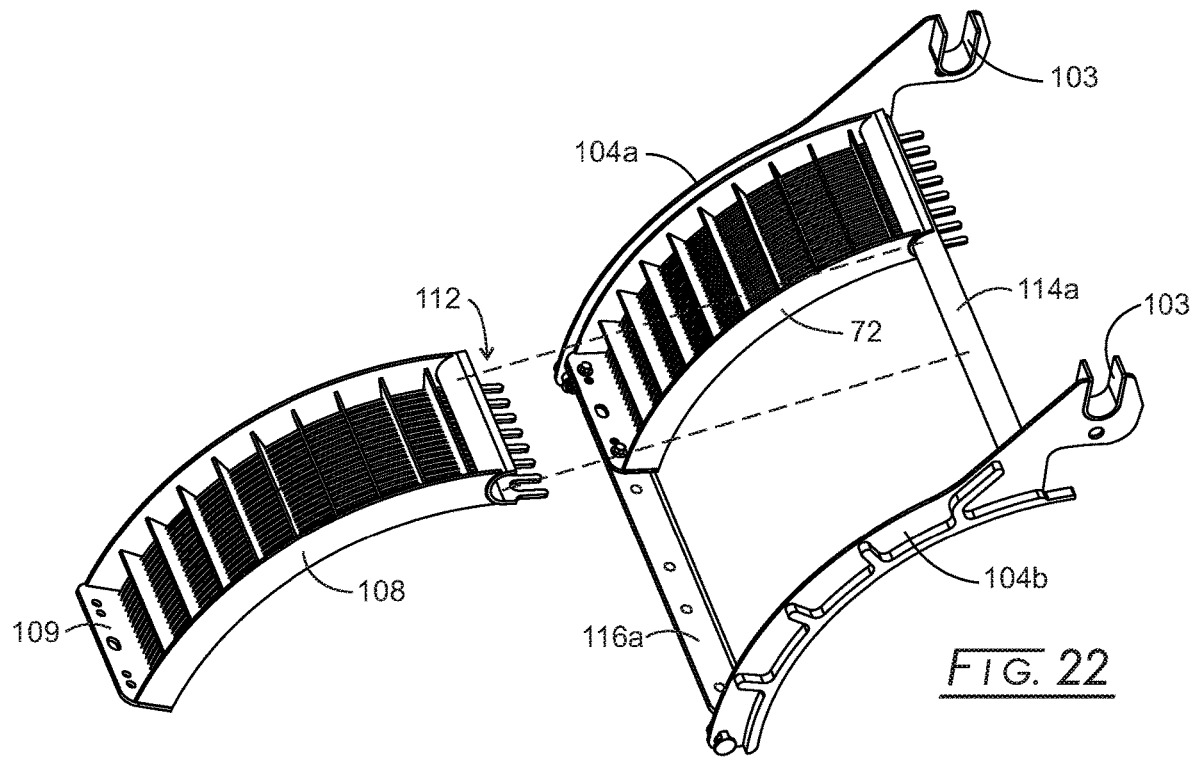
FIG. 22 is an isometric view showing installation of one of the inserts.

Looking at FIGS. 13-22, concaves 70 and grates 74 are disclosed in detail. A skeleton, 104, formed from curved spaced-apart side members (104*a*/104*b*, 104*c/d*) affixed to laterally extending horizontal spaced-apart members (114/116) therebetween, supports and accepts concave inserts, such as concave insert 72, and a skeleton, 105, formed similarly to skeleton 104, but not separately numbered, supports and accepts a grate insert, 106. There are three inserts across and three sets of these inserts spanning 270°. FIG. 20 shows skeleton 104, concave insert 72, a concave insert, 108, and concave insert 110. One end of concave insert 108 is flat plate, 109 (see FIG. 21A), for permanent attachment to skeleton 104, while the other end has a finger assembly, 112. The finger assembly end of concave insert 108 is curved and partially goes around an upper bar, 114*a*, portion of skeleton 104 by virtue of its end having a U-shape to receive upper bar 114*a*. The insertion of concave insert 108 into skeleton 104 is seen in FIG. 22 to involve concave insert 108 being moved from the side into position with flat 109 being bolted or otherwise attached to a flat bar, 116*a*, of skeleton 104 and the U-shaped upper end taking in bar 114a. A bar, 114b spans between the lower ends of curved spaced-apart side members 104e/104f, while a bar. 114c, spans between the upper ends of curved spaced-apart side members 104e/104f. All of the concave inserts are attached in a similar manner. In fact, the grate inserts are similarly configured and inserted into frame skeleton 105 in the same manner. The disclosed design permits easy installation and removal of any one of the concaves or grate inserts. A bent finger assembly, 111 (see FIG. 19A), is part of the skeleton assembly and is present for both the concaves assembly and the grate assembly and interacts with the finger ends of the concave and grate inserts to accommodate the size of the grain being handled.

Returning to FIG. 13, it will be observed that spacers, 138, 140, 142, and another not seen, provide a break between bar 124 for concaves 70 and a bar, 125, for grates 74. The same is true for bar 120 and a bar, 121. Such spacers could be omitted and the respective bars would be continuous for grates 74 to rotate as do concaves 70. Alternatively, grates 74 could be constructed, as are concaves 70 for independent rotation and adjustment.

Figure 14:
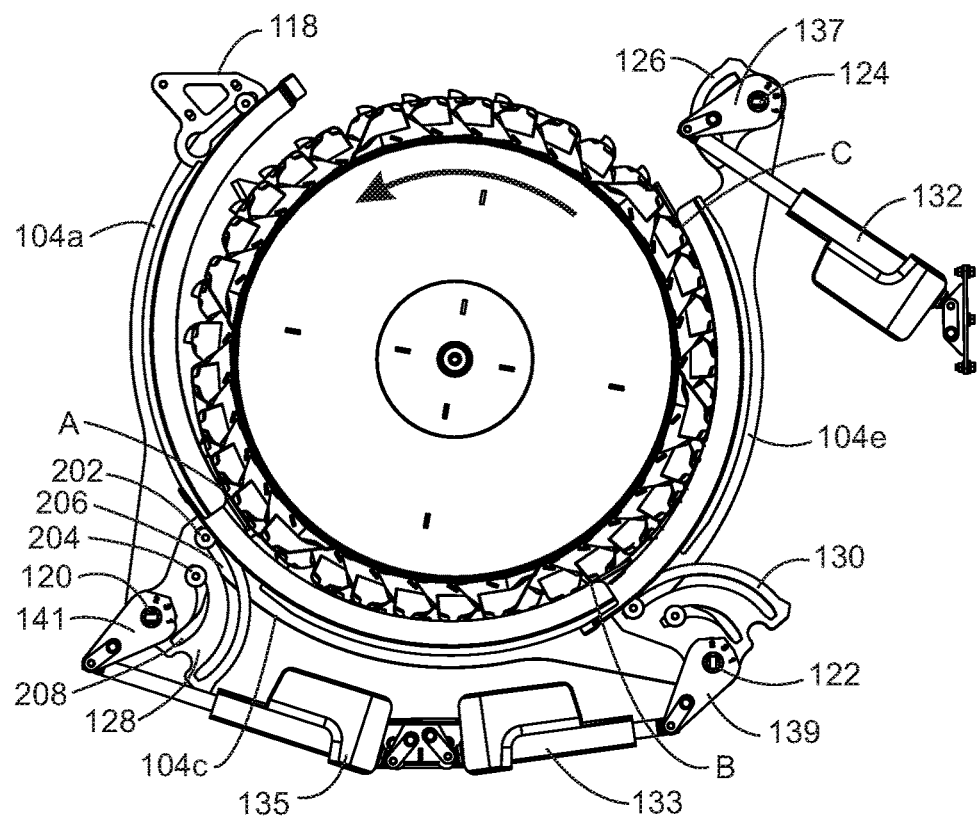
FIG. 14 is an end view of system showing the 3 linear actuators for adjusting the pinch points of the concaves for different sizes/kinds of grain.
Figure 15:
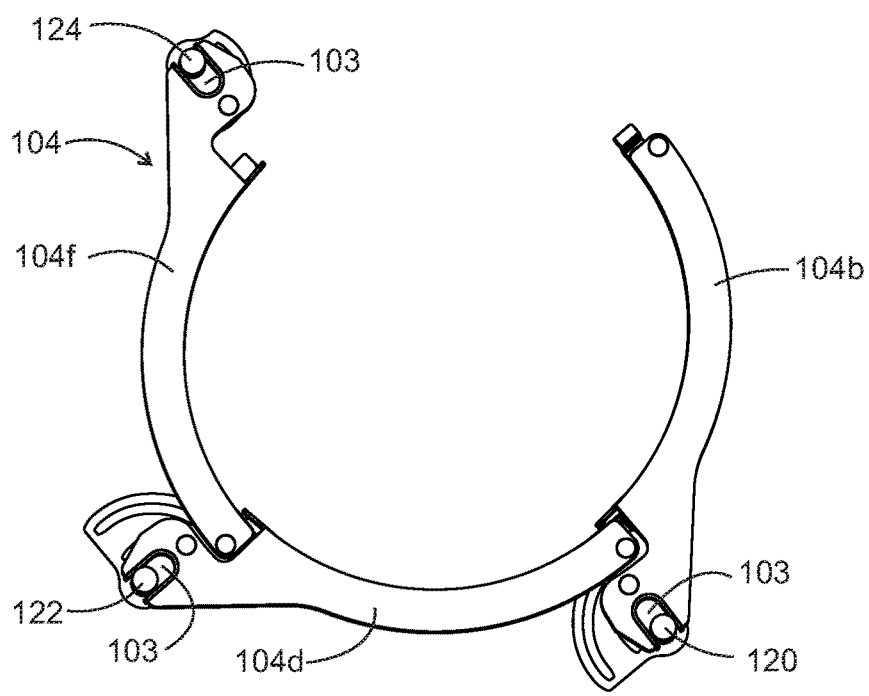
FIG. 15 is an end view of only the skeleton with each section moved closest to the rotor.

Referring additionally to FIGS. 14 and 15, the ends of skeleton 104 are configured to receive rotatable bars, 120, 122, and 124. As seen more clearly in FIGS. 14 and 16, slotted plates, 126, 128, and 130, having arcuate slots are attached to rotatable bars 120, 122, and 124 and are rotated by linear actuators, 132, 133, and 135, so that the finger assemblies of each concaves section independently are in a closed position or are in an open position. In the closed position, the inserts are in a pinched configuration with respect to rotor 54 for small grain, as in FIGS. 19 and 19A. As more clearly seen in FIGS. 18 and 18A, cylinder assembly 132 has rotated so that the finger assemblies are in an open position for large grain. The arcuate rotation results in the fingers being moved in an arcuate motion and in an up and down motion. These simultaneous motions result in the fingers, straight on one side and curved on the other side, moving closer and further apart while simultaneously moving slightly up and down.

Figure 16:
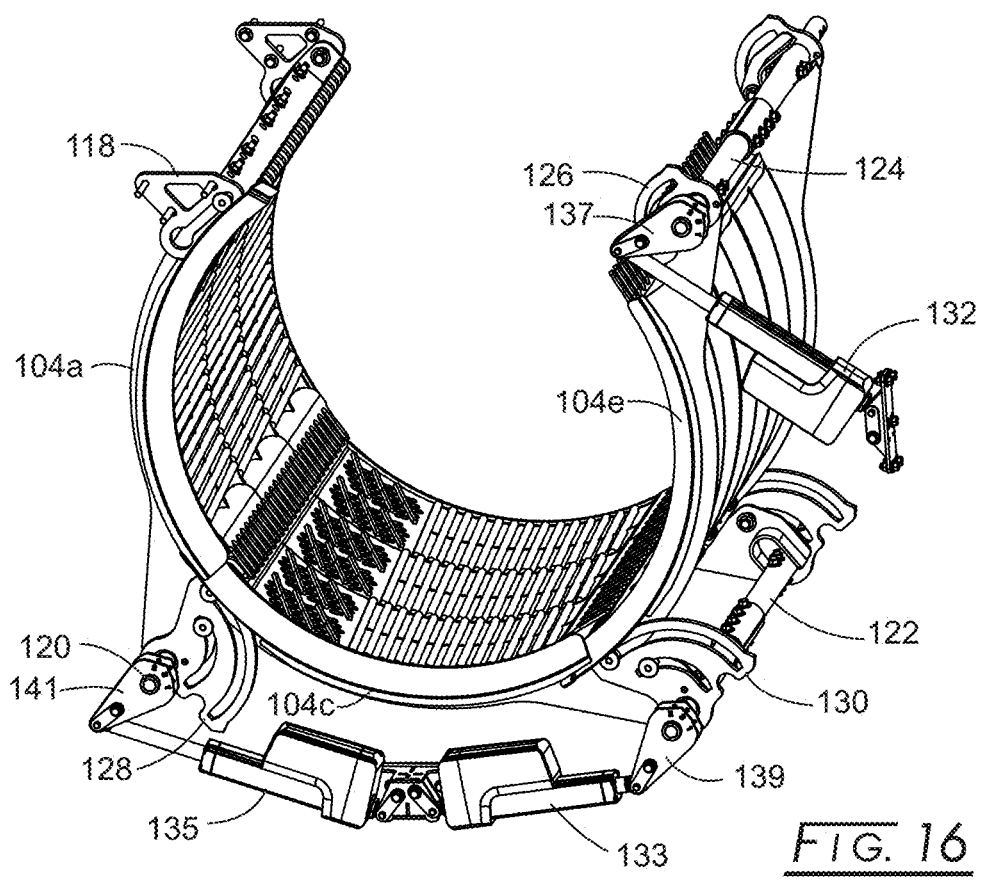
FIG. 16 is an isometric view of FIG. 14 with the rotor removed.
Figure 17:
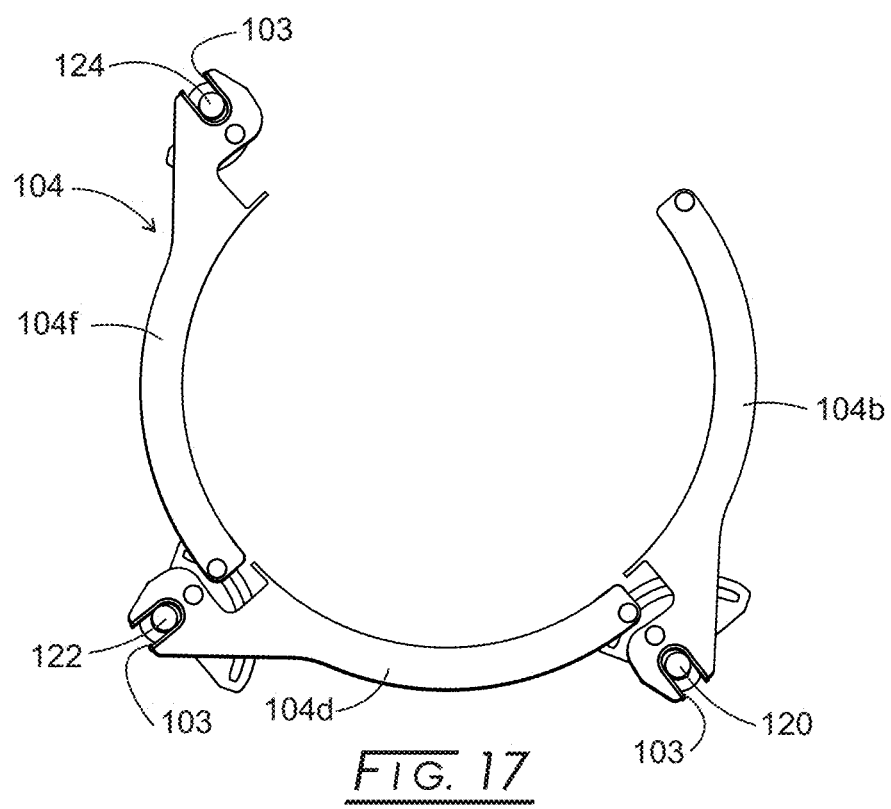
FIG. 17 is an end view of only the skeleton with each section moved furthest away from the rotor.

Referring in more detail to FIGS. 14, 16, 24 and 25, the means of turning (actuating) rotatable shafts, 120, 122, and 124 (each carried within an elongate slot, 103, located at the ends of side member pairs 104a/104b, 104d/104e, and 104c/104d, respectively) which by cam motion using slotted plates, 126, 128, and 130, moves the inserts inwardly and outwardly using individual linear actuators, 132, 133, and 135, one each for each concaves section. Each actuator is attached via lever arms, 137, 139, and 141, to rotatable shafts 120, 122, and 124, respectively, while brackets, 118 and 117 (FIG. 24), support the other corner of the insert frames 104a/104b rotation of rotatable shafts 120, 122, and 124, and can cause these shafts to rotate, thereby change the clearance of the concave inserts to the rotor rasp bars. More specifically, slotted plate 128 has a pair or arcuate slots, 206 and 208. Skeleton curved member 104A has a pin, 204, at its end that fits into arcuate slot 208. The end of skeleton curved member 104c also has a pin, 202, that fits into arcuate slot 206. Slotted plate 130 also has a pair of arcuate slots that capture pins carried by skeleton curved members 104c and 104e. Slotted plate 126 only has 1 arcuate slot into which a pin on the other end of skeleton curved member 104e. As noted elsewhere, the 3 actuators may be moved together or independently. FIG. 16 is an isometric depiction of FIG. 14 wherein each of the components described therein are seen. The pinch points where the concaves inserts are closest to the rotor are designated as pinch points A, B, and C in FIG. 14 and correspond to the moving end of each of the concaves assemblies.

FIGS. 21A, 21B, and 21C illustrate 3 different kinds of concaves inserts used for different types of grains. Additional such designs are known and used commercially.

Figure 23:
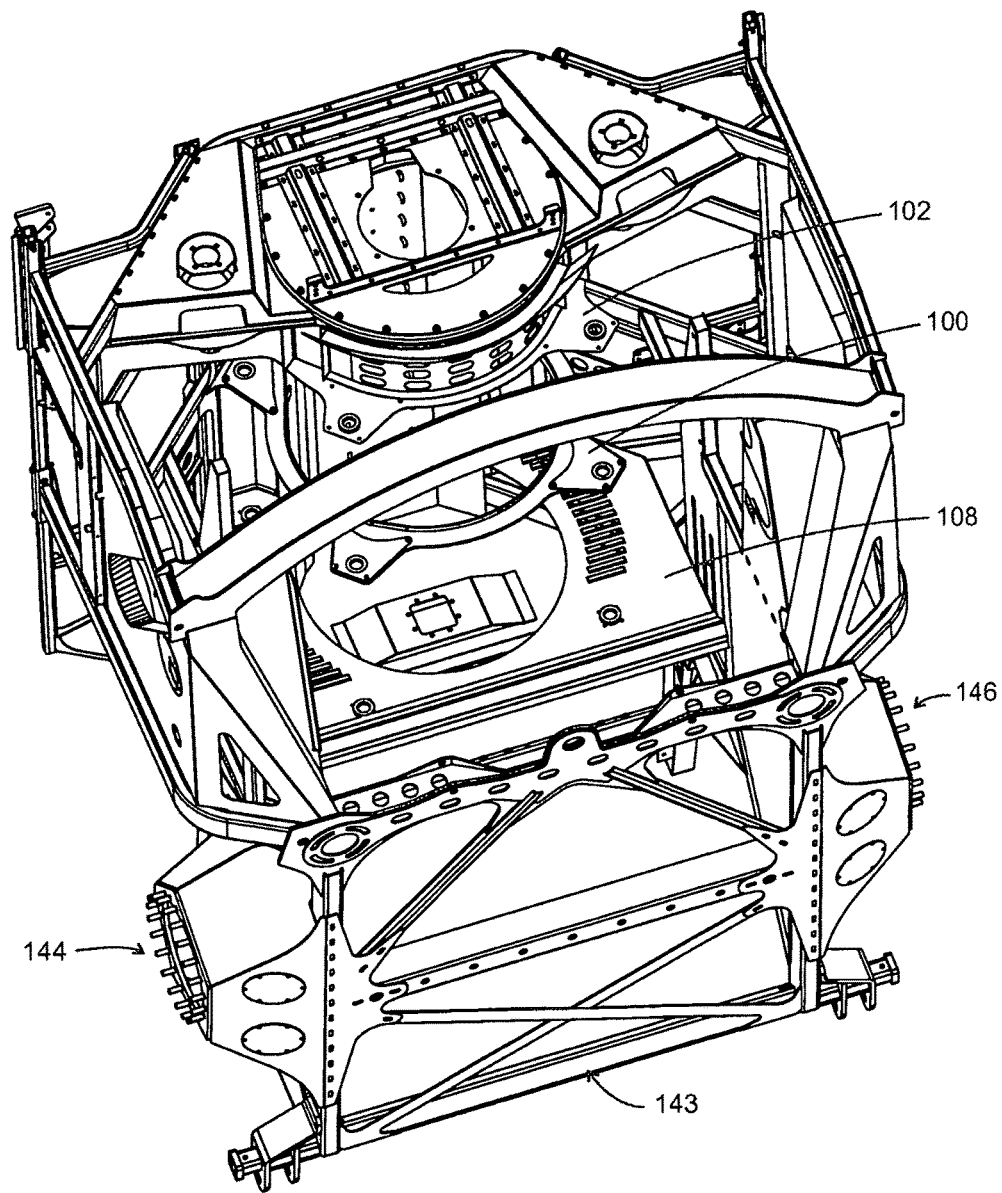
FIG. 23 is an isometric view of the frame assembly from underneath.

FIG. 23 shows PPU frame assembly 143 with its various members. Of note is the bulging of the frame behind where the tires, locations 144 and 146 are located to accommodate additional treating assemblies for separation of the grain, as described above and in related patent applications. Front slotted bulkhead 98 is seen in this view also. Some of the plates will contain holes or apertures for achieving weight reduction without sacrifice of structural strength.

Figure 24:
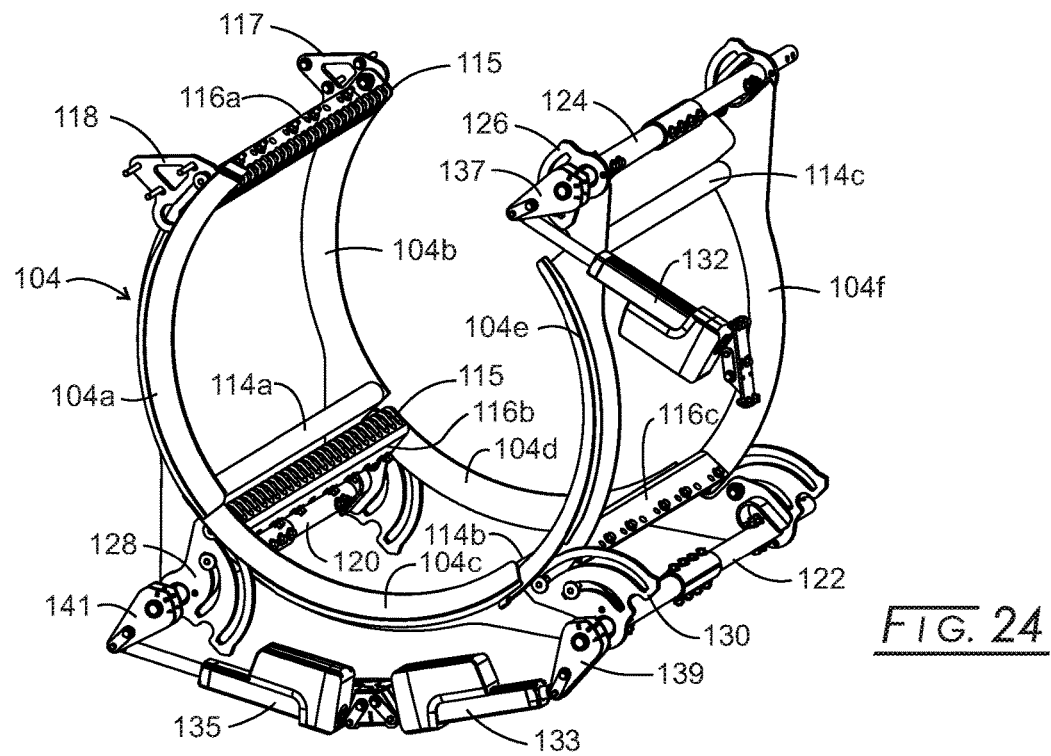
FIG. 24 is an isometric view of FIG. 16 with the concaves also removed and showing the 3 linear actuators.

FIG. 24 shows just the skeleton assembly along with the linear actuator assemblies used for moving the concaves inserts relative to the rotor. In particular, skeleton 104 is seen to include curved spaced-apart side member pairs, 104a/104b and 104e/104f; and horizontal spaced-apart members, 104c/104d, spanning between curved spaced-apart side member pairs 104a/104e and 104b/104f, respectively. Also spanning between curved spaced-apart side member pairs 104a/104b are flat bars 116a and 116b terminated with curved fingers, 115; and a flat bar 116c spanning between curved spaced-apart side member pairs 104e/104f is rotatable bar 124. The components of the linear actuator assemblies have been described above.

Figure 25:
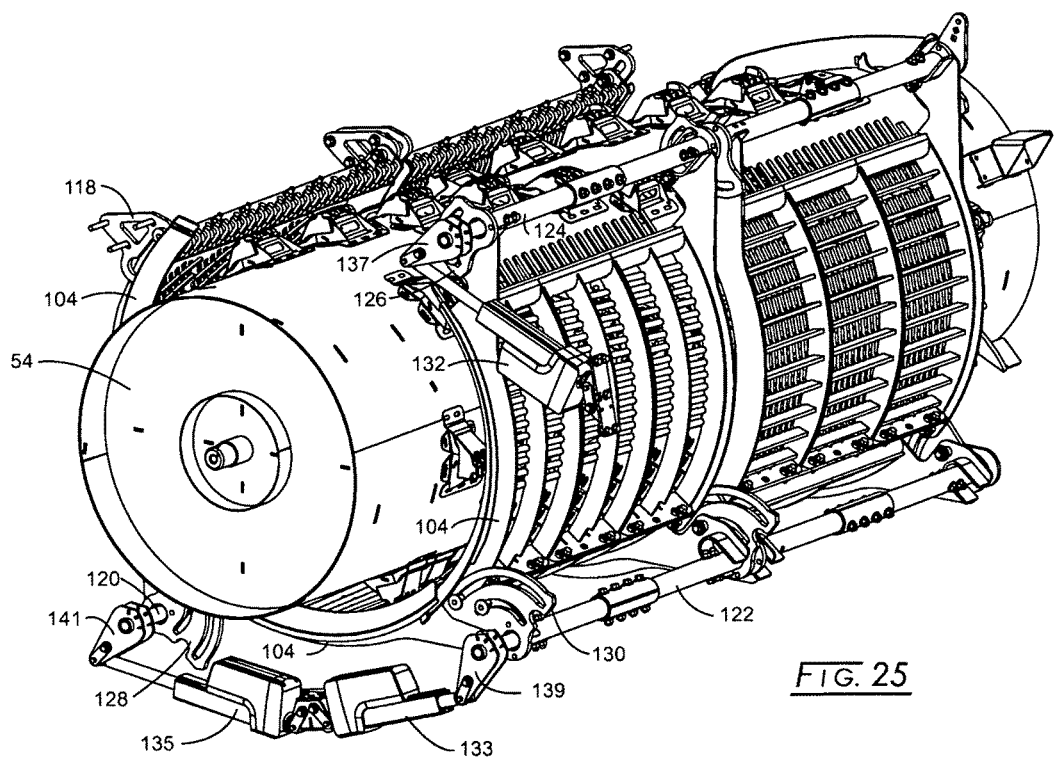
FIG. 25 is an isometric view like that of FIG. 24, but with the rotor without the initial feed spirals, concaves, grates, and individual actuator controls installed.

FIG. 25 shows the rotor in position inserted between the concaves and grates assemblies. Note that rotor inlet spiral flighting 56 has been removed. The concaves, grates, and linear actuator control assemblies are illustrated in position as such are round housed within PPU 12 for the threshing of harvested grain. While rotating bars 120, 122, and 124 are seen to control both concaves inserts and grates inserts, separate control of the concaves inserts and the grates inserts is possible.

Of additional novelty for this disclosure is the operational mode that would allow each section to be adjusted a little or a lot, and adjusted differently than each other or than the others. It is known in the industry that one can control the relative amount of material that is discharged through a porous concave surface by changing the amount of clearance that a given area of the surface has to the rotor. Wider clearances tend to discharge less material than tight clearances. In typical rotary combines, one has only the choice of changing the clearance of the whole of the surface area (called opening or closing the concave) by push button mechanical means, or by moving the entire concave right or left in (typically) slots in the mounting mechanisms, an arduous manual mechanical process. In this disclosure, each of the 3 concave sections can be adjusted independently.

Electronically, these three actuators are able to sense their own amount of length (called position) and by electronic control are caused to adjust in unison, and to remain at equal length when in operation, whatever that position the operator has chosen. That position is changed by a switch from the operators cab, and can change due to reaction to a given stimulus to crop or condition the best set the machine for maximum threshing and separation.

With the present disclosure of adjustment of each of the concaves inserts by individual "smart" actuators, it, then, makes sense that the proper digital controllers with the proper amount of programming could be caused to adjust each section to better the overall performance of the threshing system. Likewise, the individual actuators could be connected to individual switches whereby human intelligence input could adjust the given sections based on human desire and observation of what the process would best needs for optimum performance.

Not lost in this disclosure is the innovative thought that, while the current embodiment will expect to adjust all sections to similar specifications and retain relative equal adjustment of the section, it is equally possible that given the correct electronic feedback and programmed logic to oversee the action, this system lends itself to the notion of adjusting each section to a different opening in order to change some element of rotor discharge direction (right, left, down) of varying percentages of the discharge. Simply put, one could have very good and easy control of moving concentration of rotor discharge from one side of the rotor (and, thus, cleaning system) to the other, or some place between. This is desired in current combines, but requires arduous manual mechanical configuration changes to accomplish, and is not practical on a frequent or momentary basis. This disclosure looks ahead to automatic control of this function by an onboard processor or computer reacting to a stimulus as is being developed in the industry to adjust other functions.

Additionally, while electric linear actuators are shown in the drawings, such actuators could be pneumatically powered, hydraulically powered, or could be simple linear actuators, electric motors, or other assemblies. Actuators are "powered" for present purposes.

While the disclosed concaves inserts surmount 270°, a lesser or greater amount of wrap could be designed into such concave inserts. Moreover, the sections of concaves can be adjusted independently to not only effect a change in clearance to the rotor, but also to achieve multiple pinch points around the periphery in the same number as the number of peripheral sections. The drawings show 3 such concave sections resulting in triple convergence of concave clearance to the rotor; although this number could be greater or lesser. The net effect of this triple convergence is to enable a single crop pass around the periphery of rotation to have threshing and separation equivalence to three separate passes from typical configurations, greatly increasing the efficiency of threshing and separation. The disclosed design, then, permits the totality of the designated "separation" area, the grates, to be reconfigurable with respect to the type of grate separation surface chosen, as opposed to being fixed sized holes. Moreover, the grates also could be designed for simple adjustment for clearance and pinch should that be desired.

The flexibility of the concave adjustment mechanism permits their synched or adjusted independently. The same goes for the grates with the proviso that the grates could be synched with the concaves. The concave inserts and grates inserts are easily and quickly inserted and withdrawn according to their disclosed design. All concave inserts and all grate inserts are the same in design, permitting any insert to be installed in any location. Finally, the concave inserts have sets of fingered panels that move closer and apart as the concave clearance is adjusted inwardly and outwardly. These fingers on the panels are offset to each other to effect great change in the open area and shape of the open area to give prescribed separation based on crop type.

While the device and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A rotor and skeleton assembly for a harvesting combine, which comprises:
(a) rotor (54);
(b) a skeleton assembly surrounding the rotor and comprising:
  (i) a first curved spaced-apart side member (104*a*) having an upper end and a lower end, a second curved spaced-apart side member (104*b*) having an upper end and a lower end and terminated with a flat bar (116*a*) spanning between the upper ends of the first and second curved spaced-apart side members and carrying curved fingers (115) and adapted to receive a concaves section or a grates section; a horizontal concaves or a grates receiving member (114*a*) disposed opposite said flat bar (116*a*) for receiving the concaves section or the grates section; all of the ends of the first and second curved spaced-apart side members carrying a pivot pin; the lower ends of said first and second curved spaced-apart side members having a U-shape (103) in which a first rotatable shaft (120) is located;
  (ii) a third curved spaced-apart side member (104*e*) having an upper U-shaped end and a lower end, a fourth curved spaced-apart side member (104*f*) having an upper U-shaped end (103) and a lower end, a horizontal concaves section or grates section receiving member (114*c*) spanning between and adjacent the upper U-shaped ends of the third and fourth curved spaced-apart side members, a flat bar (116C) spanning between the lower ends of the third and fourth curved spaced-apart side members and carrying curved fingers (115);
  (iii) a fifth horizontal spaced-apart curved member (104*c*) having a U-shaped end adjacent to the lower end of the third curved spaced-apart side member (104*e*) and spanning to the lower end of the first curved spaced-apart side member (104*a*), the fifth curved member having pivot pins at each end; and
  (iv) a sixth horizontal spaced-apart curved member (104*d*) having a U-shaped end adjacent to the lower end of the fourth curved spaced-apart side member (104*f*) and spanning to the lower end of the second curved spaced-apart side member (104*b*), the sixth curved member having pivot pins at each ends; and
  (v) three control assemblies comprising:
  a first control assembly located adjacent to the lower end of the first curved side member and a non U-shaped end of the fifth curved side member and comprising a first slotted plate (128) having a first pair of arcuate slots (206 and 208), the pin on the lower end of the first curved side member fitting into one of the first pair of arcuate slots and the pin at the non-U-shaped end of the fifth curved member fitting into the other of the first pair of arcuate slots, a first actuator (135) attached to a first lever arm (141), the first lever arm also attached to the first rotatable shaft;

a second control assembly located adjacent to the lower end of the third curved side member and the U-shaped end of the fifth curved member and comprising a second slotted plate (130) having a second pair of arcuate slots into which the pins on the third curved side member and the U-shaped end of the fifth curved member fit, a second actuator (133) attached to a second lever arm (139), the second lever arm also attached to a second rotatable shaft (122);

a third control assembly located adjacent the U-shaped end of the third curved side member and comprising a third slotted plate (126) having an arcuate slot into which the pin at the U-shaped end of the third curved side member fits, a third actuator (132), and a third lever arm (137) attached to the third actuator and a third rotatable shaft (124);

the skeleton adapted to receive the concaves sections or the grates sections.

2. The rotor and skeleton assembly of claim 1, wherein the rotor has flights at an end for receiving grain for threshing.

3. The rotor and skeleton assembly of claim 1, which additionally comprises 3 adjacent concaves sections.

4. The rotor and skeleton assembly of claim 1, wherein the rotor contains a spiral pattern of rasp bar assemblies.

5. The rotor and skeleton assembly of claim 1, wherein the rotor has the same diameter along its longitudinal axis of rotation.

6. The rotor and skeleton assembly of claim 1, wherein the actuators are linear actuators.

7. The rotor and skeleton assembly of claim 1, wherein the actuators are computer controlled.

* * * * *